United States Patent [19]

Schroeder

[11] Patent Number: 4,622,471

[45] Date of Patent: Nov. 11, 1986

[54] OCEAN WAVE HYDRO-ELECTRIC GENERATOR FACILITY

[76] Inventor: Warren C. Schroeder, Suite C-603, Columbia Plz., 2400 Virginia Ave. NW., Washington, D.C. 20037

[21] Appl. No.: 307,498

[22] Filed: Oct. 1, 1981

[51] Int. Cl.⁴ .......................................... F03B 13/12
[52] U.S. Cl. ...................................... 290/42; 290/53; 405/76
[58] Field of Search .................... 290/42, 53; 417/100, 417/330–333, 337; 60/497, 498, 499, 501, 502, 506, 398; 405/76, 77

[56] References Cited

U.S. PATENT DOCUMENTS

| 610,790 | 9/1898 | Beckers | 60/398 |
| 933,905 | 9/1909 | Igatz | 60/398 |
| 988,508 | 4/1911 | Reynolds | 290/42 |
| 2,432,510 | 12/1947 | Danel | 405/76 |
| 2,820,148 | 1/1958 | Southwick | 290/53 |
| 2,871,790 | 2/1959 | Weills | 290/42 |
| 3,271,959 | 9/1966 | Van Gils | 60/398 |
| 4,076,447 | 2/1978 | Granath et al. | 417/330 |
| 4,141,670 | 2/1979 | Russell | 290/53 |
| 4,172,689 | 10/1979 | Thorsheim | 290/42 |
| 4,332,506 | 6/1982 | Andrews | 405/77 |

FOREIGN PATENT DOCUMENTS

2324994 11/1974 Fed. Rep. of Germany ........ 405/76

Primary Examiner—William M. Shoop, Jr.
Assistant Examiner—W. E. Duncanson, Jr.

[57] ABSTRACT

A plurality of unidirectional valved intake gate units are essentially horizontally disposed, operate independently, and are located upstream of an input penstock. They are adapted to intercept waves and convert their kinetic energy to drive a turbine. Each gate unit comprises a movable gate that is horizontally hinged and adapted to permit the incoming waves to slide over the upper surfaces of the gates and into the penstock. They are constructed so that the back pressure of the penstock pushes the gates upward directing the remaining forward moving wave energy to higher elevations increasing the water level height in the penstock.

68 Claims, 18 Drawing Figures

OCEAN WAVE HYDRO-ELECTRIC GENERATOR FACILITY

BACKGROUND OF THE INVENTION

There are numerous previous patents to operate turbines from either the rise of a tide or of an ocean wave. They all fail to develop, however, the energy conversion efficiency due to the various reason which will be discussed later. My invention captures entire waves by segmenting them into sections and converting their kinetic energy before shock absorbtion occurs. Waves for example move in and out at a rapid pace. Conversion inventions heretofore often act as jetties, neutralizing many of these forces in one manner or another and as a consequence do not develop the efficiencies as required to operate large feasible commercial hydroelectric generators. My invention also discharges the flow through the turbine in an entire outgoing wave length that is segmented, discharging the flow at the outer limits of the deenergized ocean wave. This invention makes it possible to convert the entire ocean wave at its peak kinetic force to a "river flow" affect in the penstock and race feeding the turbine and discharging the continuous flow out of the turbine in a "river flow" affect in the tail race at the lowest kinetic force thus creating the maximum head pressure differential between the race and the tail race. The amount exceeding one and one-half times the height of the ocean wave between its crest and its wave trough and providing a constant uninterrupted turbine flow. Something that has not been accomplished by any other invention of record.

The Southwick invention U.S. Pat. No. 2,820,148 funnels, by using vertical walls, numerous waves simultaneously into a narrow vertical opening that is controlled by adjusting a gate vertically. The wave water passes over the top edge of this vertically adjusted gate which also needs a continual adjustment in accordance with the ocean tidal height and in a manner for controlling the height at which wave water is admitted to the upper compartment. A second vertical gate, at the same vertical opening that is controlled by adjusting vertically comes down from the top. The gap between the top surface of the lower gate and the bottom surface of the upper gate allow the admittance of water into the reservoir. As the patent claims "the lower end of the upper gate will then skim off the upper portion of each wave as it enters the gap" thus not permitting the entrance of higher waves into the upper compartment. It too is adjusted in accordance.

In this Southwick invention, as a series of several waves are simultaneously moving into the vertical funnel walls each wave crest as it enters and strikes the walls in a continual sequencing on each side there is in turn a continuous rebound of kinetic forces which have a neutralizing affect at the outer limits for succeeding incoming waves that have not as yet reached the point of being captured in the funnel gates. Also when they finally reach the rigid vertical gate wall themselves the incoming kinetic forces strike the rigid vertical gate redirecting much of the force straight up. Some falling back seaward and some falling in the direction to be admitted between the gap of the upper and lower vertical gate opening and on into the upper reservoir for use in the turbine motor.

In the Southwick invention the water being discharged from the turbine flows into a lower compartment and is discharged between two vertical gates that swing out seaward. The water is discharged here in an opening that allows it to excape back to sea behind the funnel walls or at a point where the ocean water has now been neutralized as is behind jetties built at sea and no wave troughs exist. This greatly reduces the head pressure differentials necessary for the incoming and discharging water of the turbine and thus reduces its effectiveness. Also the two vertical gates vertically hinged to discharge by opening seaward must be long enough to accommodate both a high and low ocean tide condition. At high tide these gates must buck the seaward water pressure in opening and thereby restrict the discharge flow speed which must be timely executed.

The Van Gils invention U.S. Pat. No. 3,271,959 is a device for utilizing the energy present in rolling waves of water. The principle in this invention is primarily the construction of two rectangular long tubes laying beneath the ocean surface. One tube has a series of horizontally hinged vertical gates to except water into the tube while the second has similar gates discharging from the tube with a turbine in between each. The principle being that static pressure beneath the high wave is greater than the wave trough. The inlet tube fills at the high wave and discharges at the lower static pressure at the wave trough. This flow through water activates the turbine.

Though the tubes may be installed in a number of positions relative to the incoming waves each have drawbacks. Static water pressure at a level just a few inches below the wave trough will yield the greates differential between the wave crest and wave trough. As this level moves down the static pressures begin equallizing very rapidly. Installing the tubes deep enough to not interfere with the ocean waves and also to take into consideration the different mean ocean tidal heights much of the pressure differential is lost which in turn is a power loss. Installing the tubes at right angles to the wave looses much of the kinetic force caused by the directional movement of the waves and further when set at other angles relative to the waves either one or the other tubes, depending on installation direction, suffer from the neutralizing affect on the land side of the tube installation.

The Granath U.S. Pat. No. 4,076,447 is primarily a water-power motor operating from the principle of wave motion, trapping the water at a higher elevation, carrying a collapsable water bucket on the perifery of a water wheel and discharging it at a lower elevation. The collapsable bucket reducing the friction on the upside of the water wheel. This invention permits the wave water to move up a fixed ramp falling into a reservoir feeding the buckets. Using this principle the fixed installation would not accommodate the various ocean tidal heights. Should the installation be made to accommodate the high tidal height water would not reach the reservoir up the fixed ramp. Should it be installed to accommodate the low tidal height you are not taking full advantage of the ramp and also in that event, plus perhaps unusually high waves, there are no provisions to prevent a reverse action on the water wheel.

Granath uses another alternative that could accommodate the high tidal height but with a far greater loss in the full potential of the wave source. Here water moves part way up a fixed ramp. Above the fixed ramp are a series of horizontal gates hinged horizontal on the top side. This makes up one surface of the reservoir.

Water moves up the ramp, strikes one or more horizontal gates and pushes its way on into the reservoir. As previously mentioned a wave action is fast. As the water moves up the fixed ramp and strikes the gate the motion of the gate is back and up and to move in this direction the weight on the back sides of the individual gates act on the same principle as a hydraulic shock absorber dissepating much of the available kinetic energy. Here also the wave will move upward on the vertical walls of the gate until a lower pressure gate is reached, however, by that time you have already redirected the wave motion to the vertical movement allowing the return breaker of the wave to fall in either direction. Another disadvantage of the Granath invention is being able to discharge the water from the water wheel at the lowest wave trough level. The installation breaks up and neutralizes the wave forces to a mean level position thus reducing much of the operating efficiency.

The Russell invention U.S. Pat. No. 4,141,670 is a device for extracting enery from water waves. It accomplishes this in principle by means of a high and low reservoir with vertical hinged vertical gates in one method or horizontal and horizontally hinged gates in another alternate method, both powering a turbine by the water head differential. It too has many deficiencies necessary to develop a maximum conversion efficiency necessary to develop large commercial hydro-electric power. And the invention statement also recognizes and states that the head pressure flow through the turbines between the high-level and low-level reservoirs is in the order of around one-half of the wave height at sea.

In the Russell invention one method indicates vertical gates vertically hinged on the lower level or discharge reservoir swinging out seaward and adjacent nearby vertical gates vertically hinged that swing in on a twist in the upper level reservoir, made perhaps of rubber to permit this twisting. In any event the gates would need to be sufficient in length to accommodate the difference in ocean tidal height. In a high ocean tidal period the vertical discharging gates, vertically hinged will be submerged below the wave trough and in opening will be restricted by the back up water pressure, thereby not permitting maximum discharge from the low level reservoir and the vertical inlet gates, vertically mounted, that are to open on a twist will need to be sufficient in length to accommodate both a high and low ocean tidal condition which restricts the inlet flow. Further the vertical surfaces both on and between which both the vertical inlet and vertical outlet gates are mounted will redirect much of the income wave motion causing it to be redirected vertical causing water falling seaward and other kinetic energy neutralized and absorbed.

In an alternate method in the Russell invention a series of vertical stacked horizontal gates hinged horizontal from the top and are for the purpose of admitting water to the upper reservoir are nearly identical to the Granath invention U.S. Pat. No. 4,076,447 and they have the same adverse affect as was discussed in the review of that patent. The alternate arrangement shows stacked horizontal gates, hinged horizontally from the bottom for the discharge reservoir which will discharge better than the vertically hinged discharge gates, however the gates at some points will not fully discharge the inlet waters because the gate will not be permitted to fully open and the water must escape from the ends. Further the vertical surfaces of the gates and the vertical mounting wall of the reservoir meet with the same problems of redirecting the wave energy as discussed previously. Another very decided adverse condition in the Russell invention as shown in the alternate arrangement is the vertical arranged series of vertical mounted horizontal gates and hinged horizontally at the top which serve as water inlet gates to the upper reservoir are located directly above a similar series of vertical arranged series of vertical mounted horizontal gates and hinged horizontally at the bottom which serve as water outlet gates to the lower reservoir do not effectively allow for ocean tidal height variations. While you are in the upper tidal stages you are sacrificing at the lower outlet gates and while the tidal level is at the lower levels you are sacrificing at the upper inlet gates. The combine affect is a reduced continuous operating head between the high and low level reservoirs.

Thorsheim invention U.S. Pat. No. 4,1712,689, a wave power generator operates on the principle of collecting a very short section of a wave and directing it into a rigid rectangular shaped funnel, excepting lower surface is rounded, in a manner causing the breaking of a single large wave down into a series of small waves or ripples and continuing on into a manifold and turbine generator blade. A series of these funnels are staggered at the small end to improve the unifromity of constant operation of the blades of the generator.

The unit is mounted on a member floated in water. It is very limited in the amount of energy that can be directed to apply on a turbine generator and is further restricted by the fact the mounting vessel disrups the wave form for discharging, thus limits the head differential on the imput-output flow of the turbine.

The Reynolds invention U.S. Pat. No. 988,508 is a wave power system operated from a stationary platform. The principle here is to let the back and forth movement of a wave actuate a paddle thru a small arc and having a vertical axis. This axis is connected to a crank arm which operates a piston pump. As the waves move back and forth water from an internal reservoir is pumped to a higher reservoir and from here to the turbine generator and back to the reservoir. To smooth out the response and increase the power many paddles and pumps are used. Though the turbines will turn the efficiency is something to be more fully desired.

The Igatz invention U.S. Pat. No. 933,905 is an auxiliary power system mounted on a boat or other floating vessel. In this invention water is ducted from four tubes which have inlet orfices facing the forward direction of the vessel. Two begin in the front and two on each side. Two each of these tubes are connected to separate penstocks, one inside on each side of the vessel. As the vessel moves forward the water enters the ducts and flows downhill to the penstock. At the penstock the water flows through turbines on each side exiting below and in front of the driving propellers, hopefully in the wake. Their power is derived from the forward motion of the boat and in principle allowing the water to flow on thru, into a turbine and out and utilizing this flow in operating a turbine for an auxiliary power source. Without a forward motion there would be no flow and no differential in entrance and exit pressures.

The Weills invention U.S. Pat. No. 2,871,790, is a buoy motor operated from ocean waves mounted in a ship having a turbine generator or a stationary platform. The principle here is to guide a buoy that is connected to a piston pump. The buoy moves up and down with the wave pumping water into an upper reservoir where it is free to flow through a turbine and discharge into a lower self contained reservoir where it continues to recirculate. It is only the weighted buoy in its down stroke that moves the water flow to the higher elevation. The upstroke or buoy lift sucks the water from the reservoir and refills the piston cylinder. A multiple of piston pumps operated by the buoys are used to increase and to stabilize power. The systems efficiency relative to installaion and availability of wave energy is very low.

SUMMARY OF THE INVENTION

The principle objectives of the present invention is to convert the kinetic forces in and around ocean waves and the kinetic forces in the movement of these waves in such capacities that major commercial HYDRO-ELECTRIC GENERATORS in the order of 35,000 horsepower are economical and commercially feasible. Systems, principles and inventions employed in the past do not lend themselves to this magnatude of operation nor efficiencies required.

To accomplish these and other objectives of the invention improved structural details, preferred forms and concepts are illustrated by the accompaning drawings. The conversion of the available kinetic energy begins with utilizing a rather long section of the incoming ocean waves, preferably near the shore line on permanent installations and without allowing these forces to dissipate before being converted due to equipment obstructions of any kind. A wave motion is fast and it must be captured and converted fast before any time element is lost and shock absorbtion occurs in the conversion process, thus greatly loosing the efficiency necessary. To accomplish this a continuous system of independent moveable shuttle valve gates are installed in the structure that allow each segment of the wave to be captured independently before any wave form transformation occurs. The inlet shuttle valve gates are hinged horizontally at the seaward side and arranged in a manner to allow the kinetic force of the wave to flow over its upper surface and on into the penstock with minimum interferences. The pressure in the penstock raise the independent shuttle valve gates and balance out against the kinetic force of the incoming wave. If the penstock forces are less water is admitted, if not, the water is not admitted. The size of the penstock and the input flow requirement of a particular size turbine will determine how much new flow is required and admitted into the penstock to feed the "river flow" affect feeding and turbine race. And to further increase the "river flow" height in the penstock the shuttle valve gates are hinged and elevated in a manner that as the wave crest passes into the penstock over the shuttle valve gates the back pressure of the water in the penstock thrusts the shuttle valve gate upwards directing the remaining forward moving wave energy to a higher height and thereby increasing the water elevation in the penstock. Though the shuttle valve gate has a considerable allowable movement in practice its motion is actually limited to admitting a "flow replacement" water volume only.

To eliminate any adjustment in the shuttle valve gates due to an ocean high tide or low tide condition, within reason, the shuttle valve gate is constructed in a manner to permit it to operate equally well at either a high or low tidal condition. And to restrict the amount of movement of the shuttle valve gate at any ocean tidal height automatic adjustable stops are added to the structure. This is accomplished by the use of a pneumatic wheel having its' pivot off-center, whereby it acts as a cam. One-half revolution of the cam or wheel adjusts the shuttle valve gate stop in relation to the ocean tidal height from high to low. A servo controlled valve time to the tide controls it continuously relative to the requirement. These cam may all be inter-connected as required to control the shuttle valve gate movements by being connected to a single control shaft as the drawings indicate.

The vertical elevation of the horizontal hinge centerline of the shuttle valve gate need not necessarily all be installed at the same height. They will need, however, to be of a height that in operation, dependent on flow requirement, that permit the shuttle valve gate to have an inclined surface to the penstock in all operating conditions. Where these hinge centerlines may vary in height the common single axis, for the wheels which act as shuttle valve gate stops, may be installed in an elevated position at the one end in accordance.

As a continuation of the inclined surface of the shuttle valve gate a fixed adjustable inclined surface begins, and without offset, at the shuttle valve gate hinge and extends seaward well below the incoming wave and its' associated kinetic forces as will be experienced at low ocean tidal conditions. This permits the picking up of all incoming kinetic forces and without disruption of any kind and move them upon a slide until such time as they are absorbed in the penstock, thus creating an optimum head level for use in the turbine. This construction allows the kinetic force of all incoming waves, independent of the different wave heigthns, to advance into the penstock should there be a requirement for their acceptance. In the event of storms and unususlly high waves the structure configuration allows the waves to pass on over the penstock top and on into the ocean behind without further adjustment or modifications.

The water passes from the penstock in a "river flow" affect into a submerged typical hydro-electric turbine and rises through the turbine draught on to a long segmented tail race for discharging back to the sea.

The tail race is also constructed of a structure long enough to accommodate a continuous wave trough. It too is segmented into sections with shuttle valve gates working in the reverse manner and of such construction as to allow the discharge at the lowest wave trough in a "river flow" affect, thus developing the highest differential head between the penstock, turbine race and the tail race yielding optimum conversion efficiency. To restrict the extra movement of the independent moveable shuttle valve gates from a high to a low ocean tidal condition and the reverse a pneumatic tired wheel stop acts as an adjustable cam for the shuttle valve gate the same as used for the inlet water into the penstock. The wheel axis are off-center by an amount that a one-half revolution adjusts its' stopping peripheral surface to the extend of the difference between the high and low ocean tidal height. It too is controlled at the one end by a single servo control unit. To restrict abrupt shuttle valve gate movement on the outlet or discharge tail race from the incoming waves, shock absorbers are added to the shuttle valve gates. Here also the valve openings are partially shielded from the seaward side. The shields further restricting high waves from entering the tail race, but in the event of severe storm wave conditons these waves would be free to pass on over the entire tail race structure and on into the ocean behind without further modification or adjustment unless it be desired to construct the tail race with top covers.

The construction further lends itself to be mounted within a stationary tendor ship or on a stationary working platform barge at sea. When used on a floating vessel no provisions are required for ocean tidal changes, therefore cam stops are not used in conjunction with the shuttle valve gates supplying the penstock, but instead fixed pneumatic tired wheels or other suitable stops are used.

To prevent major foreign objects from entering and damaging the turbine suitable wiers are added ahead of the shuttle valve gates supplying the penstock. And to assist with maintenance of the equipment, shutting off the water inflow, provisions are added to insert sealed panel stops ahead of the shuttle valve gates and at various points in the penstock and tail race as deemed necessary for such maintenance.

This construction allows the forces of the energized ocean waves and with all their associated kinetic forces to be converted to a "river flow" affect feeding a turbine and to discharge all the consumed or deenergized wave water back to sea in a "river flow affect at its lowest point creating a continuous maximum head pressure differential between the two.

DESCRIPTION OF THE PREFERRED EMBODIMENTS

Figure 6:
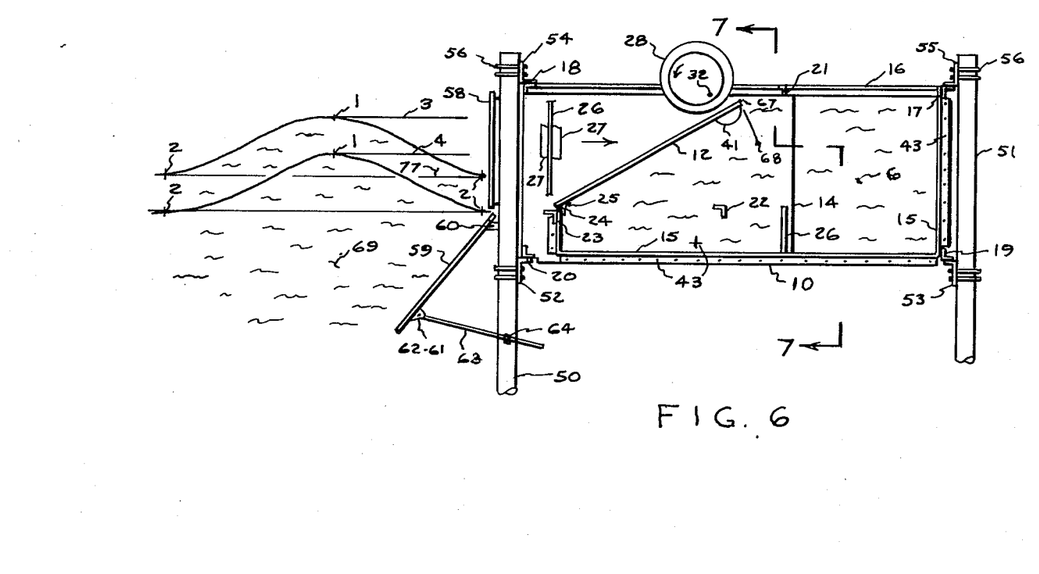
FIG. 6 shows the water input, wave capturing valve gate and penstock as used in a permanent ocean installation.
Figure 11:
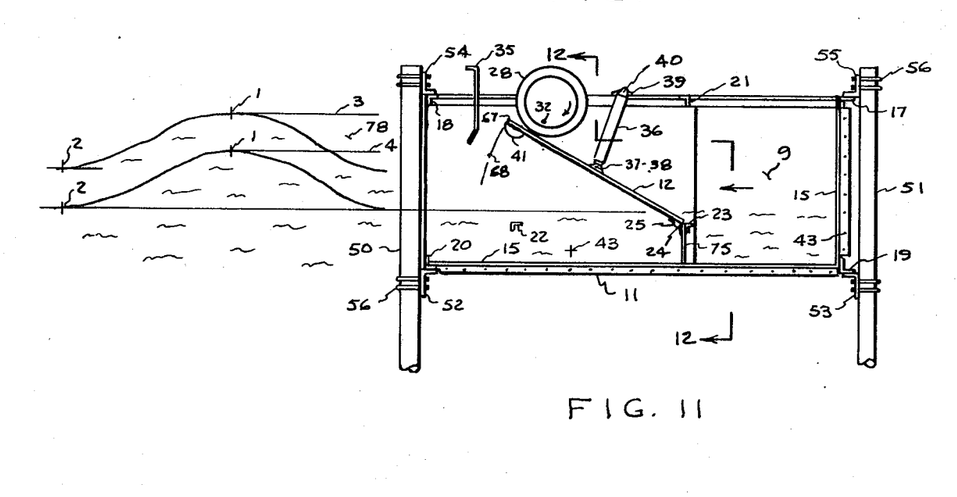
FIG. 11 shows the water discharge from the tail race and valve gate as used in a permanent ocean installation.
Figure 15:
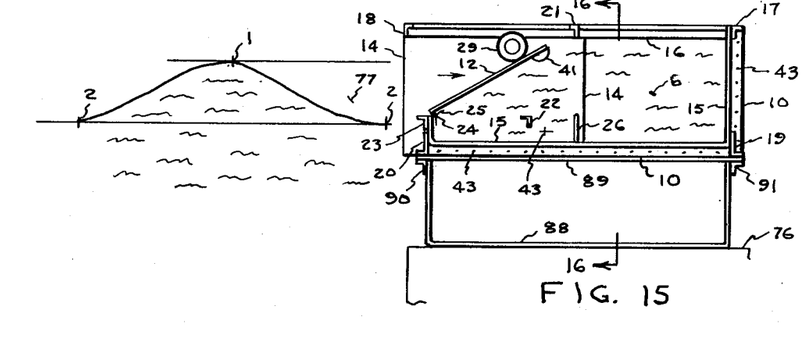
FIG. 15 shows the water input, wave capturing valve gate and penstock as used on a SHIP installation.

Reference 1 indicates the ocean wave crest. Reference 2 indicates the ocean wave depression. The difference between reference 3 and 4 shown in FIGS. 6 and 11 indicates the difference between a high tide and a low tide. In FIGS. 1, 2, and 3 5 shows the position of the turbine/generater; 6 indicates the penstock, 7 the race, 8 the turbine draught, and 9 the tail race. In the same figures 10 indicates a unit section of the water input, wave capturing valve gate and penstock; 11 indicates a unit section of the water discharge from the tail race and valve gate. Eight unit sections each are shown. The ends are identified by reference 71 and 72. The number will vary depending on the input and discharge requirement of a given size turbine/generater selected. 12 is the valve gate. 12 is fabricated as a light weight laminated honeycomb bonded structure. At the upper end and running the width of 12 is added air tank 41. To the lower end a hinge 24 is secured to both 12 and a 23 structural member. This allows 12 valve gate to travel through a partial arc. Its travel distance is stopped on the way down by a structural member 22 and on the up side by either a pneumatic cam valve gate stop 28 or a pneumatic valve gate stop 29. Reference 77 indicates the water input side. Reference 78 indicates the water discharge side. FIGS. 4, 6, and 15 show a cross section of the water input, wave capturing valve gate and penstock. As the wave approaches the valve gate the wave applies a force on the valve gate 12. The water in the penstock area is holding the valve gate 12 against the pneumatic cam value gate stop 28 or the pneumatic valve gate stop 29 (FIGS. 4 and 15). If the force from the wave is greater than the penstock the valve gate moves down and the wave water moves across the valve gate. As the wave receeds or the pressure is reversed the water is trapped in the penstock. The size of the 41 valve gate float tank is only of a size to hold the upper end of the valve gate 12 afloat. The light weight laminated honeycomb bonded valve gate also has inherent a float capability.

28 in FIG. 6 is a pneumatic cam valve gate stop. This is a wheel rim and an inflated tire mounted thereon, the axis of which is off center as shown in the drawing. The difference between reference line 3 and reference line 4 is the difference between a high tide and a low tide. To restrict the movement of the valve gate 12, as the tide requirement change, 28 oscillates from high tide to low tide. It moves one-half revolution. Reference point 67 shows the high tide maximum position of 12. Reference point 68 shows the low tide maximum height position of 12. All 28's of the eight 10 section units are interconnected to a single controlled power drive 73 by the use of 32 axles and 33 connecting links supported by 30 bearing mounting blocks. All 28's of the eight 11 section units are interconnected to a single controlled power drive by the use of 32 axles and 33 connecting links supported by 30 bearing mounting blocks. Both 73 and 74 are servo controlled drives timed to oscillated 28's one-half revolution between high and low tide (optional—They could continue to rotate in one direction). 29 in FIGS. 4, 5, 15, and 18 is a pneumatic valve gate stop. This is a universal transportation wheel rim and an inflated tire mounted thereon. It is fixed mounted to 31. 31 is a spacer mounted to the main structure 14. 29 is fixed since the installations on which it is used floats with the tide and need not compensate for the various tidal wave levels.

To increase the effectiveness of the water input wave a wave amplifier is installed on each water input unit section. Two alternatives are shown. In FIG. 6 59 is a structural panel hinged by 60 at the approximate same level as the 25 hinge used on 12. At the lower surface of 59 a mounting bracket 61 is added near each end of the panel. They are connected by support strut rods 63 and pins 62. The panel is pulled out and each is secured by a swivel clamp 64. In FIG. 4 59 panel is secured at each end with a structural member 93 and a pivot 94. 93 is extended in order that it may be set for operation from above the water surface. It is secured when set by 95 hardware. In stowage position 97 is moved to position 96.

A kinetic force moving in the direction of the wave also exists below the wave surface at reference point 69. The wave amplifier reflects this force in an upward direction. The combined forces plus the position of 12 greatly increases the effective wave height differential thus also inturn the effective efficiency of the turbine/generater.

This invention not only captures the wave but also all the driving forces behind the wave movement are captured and converted to electrical energy.

Figure 7:
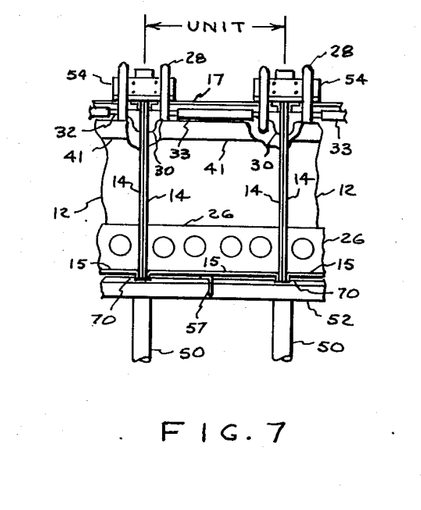
FIG. 7 shows cross section of FIG. 6 of valve gate and penstock.
Figure 12:
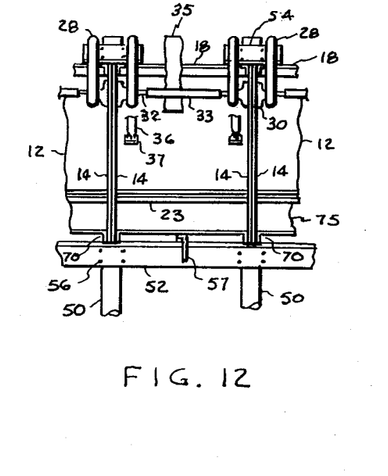
FIG. 12 shows cross section of FIG. 11 of valve gate and tail race.
Figure 13:
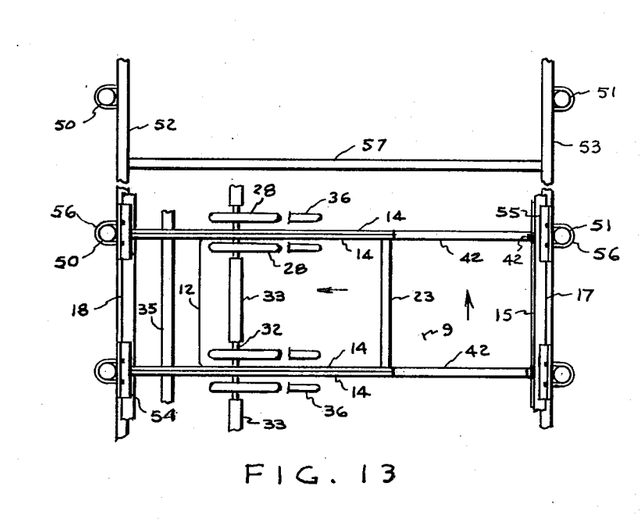
FIG. 13 shows a plan view of FIG. 11 of valve gate and tail race.
Figure 17:
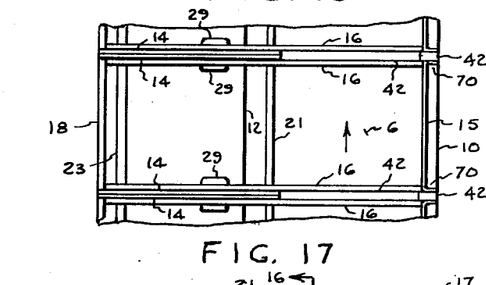
FIG. 17 shows a plan view of FIG. 15 of valve gate and penstock.

10 unit sections are fabricated in separate sections. A section length is shown in FIGS. 7 and 12. Convenient fabrication lengths might be in the order of ten to twelve feet. A unit comprises two side structures 14, two upper side structural supports 16, an upper end structure-rear 17, an upper end structure-front 18, a lower end structure-rear 19, a lower end structure-front 20, an intermediate structure-upper 21, an intermediate cross structure 22, a valve gate hinge structure 23; a structural baffel 75 on the 11 unit sections and a 26 on the 10 unit sections, and the basic ends and bottom structure 15. 15 parts are flanged at their ends as shown in reference 70 of FIGS. 7, 12 and 17. They are secured independently to the 14 panels.

The above parts form the basic unit structural members.

Figure 14:
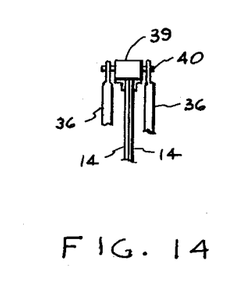
FIG. 14 shows the mounting of the shock absorbers to the main frame.

There are additional components added to the tail race valve gate units 11 (water discharge. A splash shield 35 is added. This runs between the two 14 side panels. It limits the height of the wave the valve gate needs to trap. Also added are two shock absorbers 36 to each of the 12 valve gates. Brackets 37 and pins 38 secure 36 to 12 and a mounting block 39, FIG. 14, containing a shaft 40 provide for the upper attachment of 36. 39 is permanently secured to the two 16 structural members. The shock absorber 36 restricts the movement speed of the valve gate 12.

Figure 1:
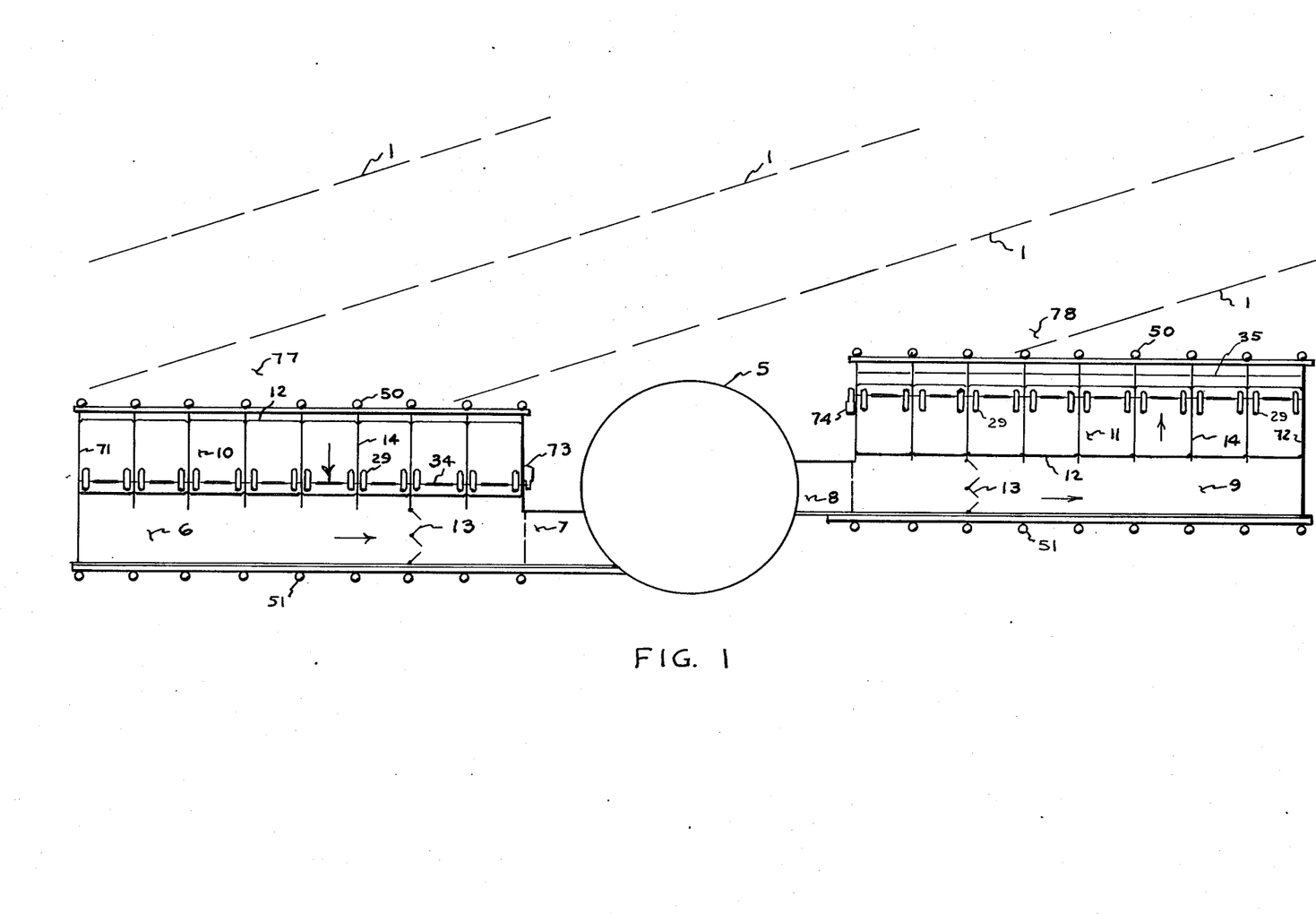
FIG. 1 shows a plan view arrangement of the ocean wave HYDRO-ELECTRIC GENERATOR FACILITY permanently installed in the ocean.
Figure 9:
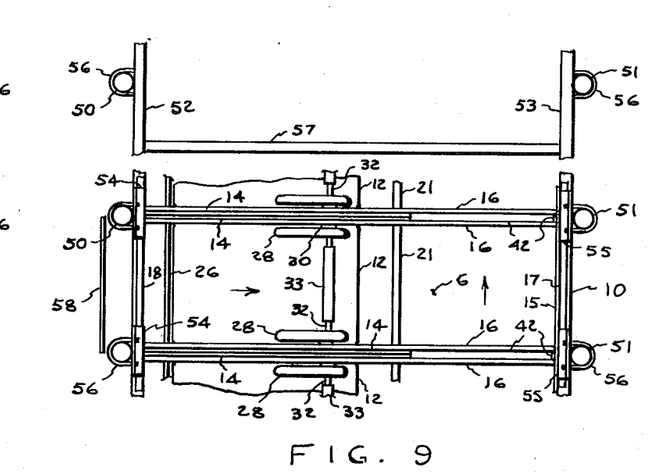
FIG. 9 shows a plan view of FIG. 6 of valve gate and penstock.

The installation of an OCEAN WAVE HYDRO-ELECTRIC GENERATER FACILITY is located in the ocean near its perimeter as shown in FIG. 1, however, is not necessarily restricted to this configuration nor does the common axis of the penstock and tail race need to be parallel. Piers are installed to support the eight 10 and eight 11 unit sections. 50 are the front pier posts, 51 are the rear pier posts. Spacing centerlines correspond to each 10 unit length. To the pier posts are added structural members 52 front and 53 rear. These are secured by clamps 56 which permit a leveling of the structural members 52 and 53. A 57 structural member is added intermediate to each set of piers as shown in FIGS. 7, 9, and 12. This basic structure now supports the 10 and 11 unit sections. Each is set to rest on the 52, 53, and 57 structure. They are attached as required by hardware 43. A spacer 42 is added at the penstock and tail race area along the bottom and rear side to compensate for the thickness of the two 14 structural members each terminating beyond the valve gate 12. To secure the top of 10 and 11 units to the pier posts splice structures 54 and 55 are added. They are secured to 17 and 18 structural parts and by 56 clamps around the pier posts.

Between each of the 50 pier post at the entrance of the input water 77 a wier 58 is added to keep out the major foreign bodies.

Figure 10:
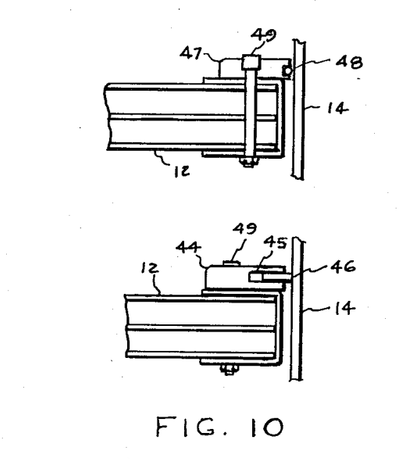
FIG. 10 shows two methods of seals for the valve gate.

To form a seal for the valve gate 12 separating the ocean wave water from the penstock 6 or the tail race 9 some additional parts are added. 25 is a neoprene or equivalent seal running the full length between the two 14 structural parts. It is secured to 15 and 12. In FIG. 10 two types of valve gate 12 seals are shown. 47 block running from top to bottom of 12 contains an "O" ring 48 and is secured to 12 by 49 hardware. 44 is a block running from top to bottom of 12 and is slotted to accommodate a series of leaf springs 45 and a series of teflon bars 46. A compression spring (not shown) at the top pressing on 46 bars hold them tightly together. This allows independent movement to compensate for considerable variations. The leaf springs 45 maintains a pressure on bars 46 against sides 14. It is not a requirement to maintain a perfect seal on the valve gates 12 as the water is plentiful and efficiency is not affected.

Figure 8:
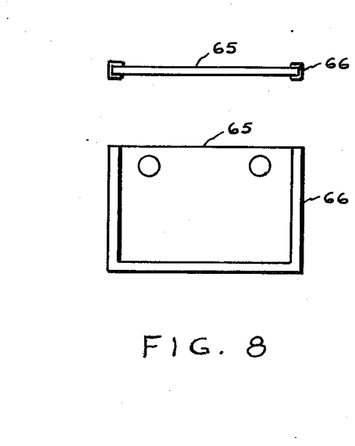
FIG. 8 shows details of a shutoff gate.

To close off the ocean water for any type of maintenance work a shutoff gate 65 is added. It is shown in FIGS. 6 and 8. This is a light weight laminated honeycomb bonded structural panel with hoisting holes and is surrounded on three sides with a flexible air boot 66. Either an internal or an external is optional. This shutoff gate 65 is supported by guide rails 27 secured to 14 panels. After installation air pressure is applied to the boot for sealing. Provision similar may also be installed at select points in the penstock 6 and tail race 9 to control water for maintenance or turbine shut down.

To smooth out the flow of water in the penstock 6 and the tail race 9 check gates 13 shown in FIG. 1 may be intermittently added. These would be used in extremely rough water conditions and would be installed in the penstock 6 and tail race 9 at a height reflecting the faster flow region. (They do not run to the bottom of the structure.)

Figure 2:
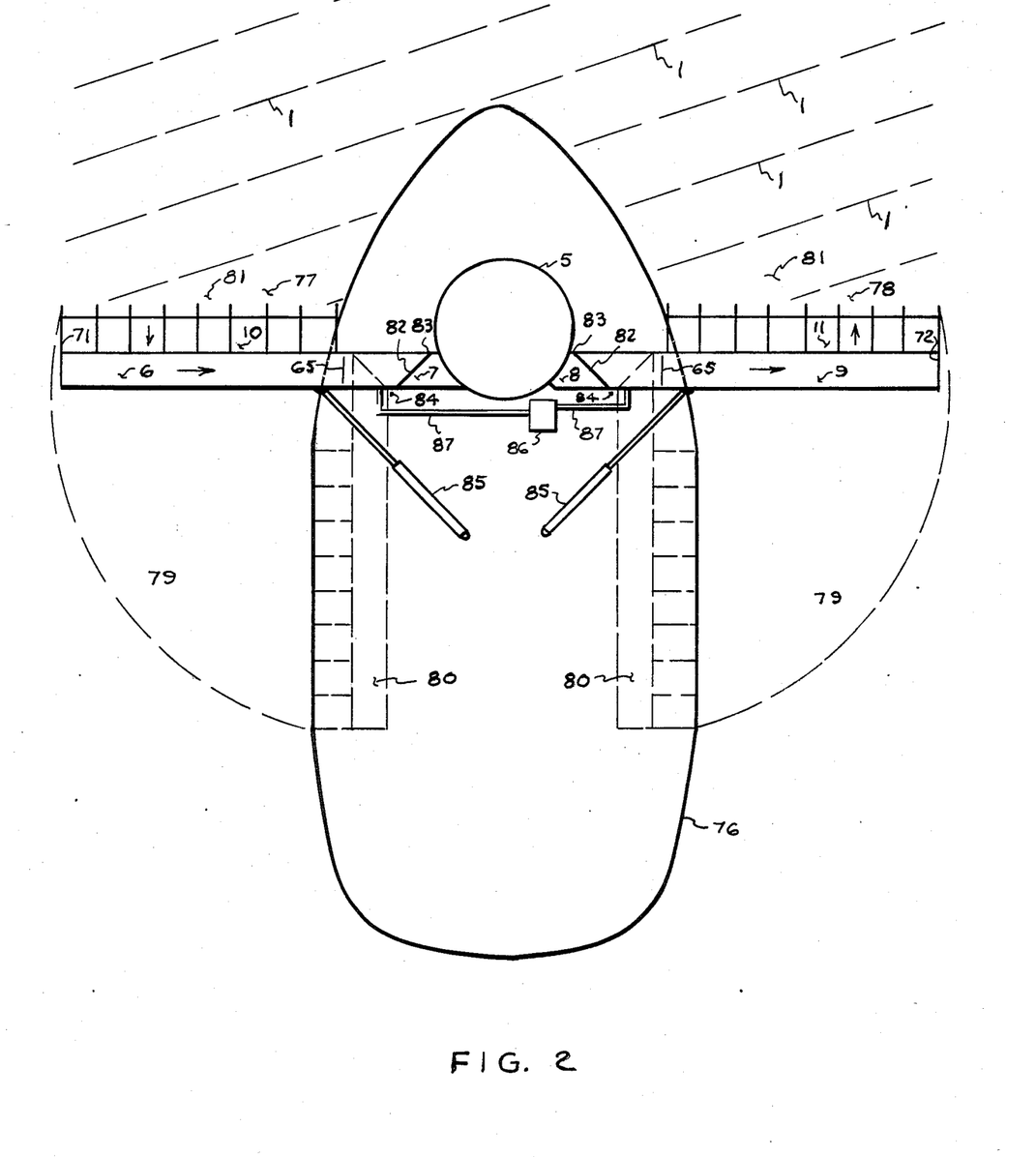
FIG. 2 shows a plan view arrangement of the OCEAN WAVE HYDRO-ELECTRIC GENERATOR FACILITY installed in a SHIP.

FIG. 2 shows the OCEAN WAVE HYDRO-ELECTRIC GENERATER FACILITY installation used on a SHIP 76. In this case the SHIP is stationed as part of a fleet in an ocean and is supplying auxiliary electrical power to other ships of the area.

Essentially this system is the same with the addition of equalizing tanks 88 added. The valve gate 12 is shorter. It does not have to accommodate both a high tide and a low tide extreme and a fixed stop 29 is used instead of a cam stop 28.

Figure 16:
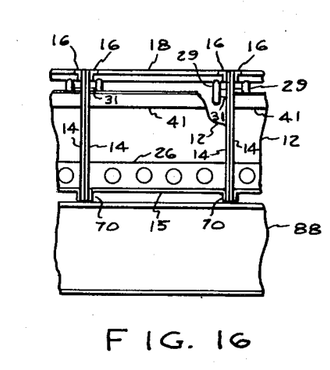
FIG. 16 shows cross section of FIG. 15 of valve gate and penstock.
Figure 18:
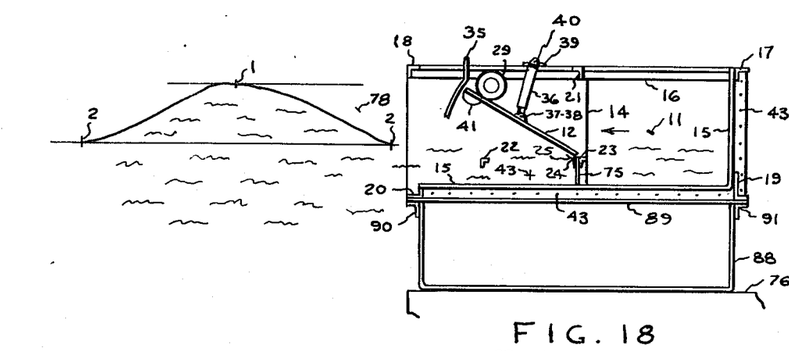
FIG. 18 shows the water discharge from the tail race and valve gate as used on a SHIP installation.

88 equalizing tanks are added beneath both units 10 and 11. They are covered by structure 89 and secured to 10 and 11 units by structural members 90 and 91. They are shown in FIGS. 15, 16, and 18. They are made with numerous compartments to distribute and maintain the position of their water fill. A transfer pump 86 is added with the necessary plumbing 87. A mercury switch sensor or the equivalent (not shown) directs the flow of water from one side to the other as is required to maintain a balance. Also the buoyancy is used to support the torsional loads applied to the ship. Reference 80 shows the stowed position of the system. The ship is aligned with the waves and anchored similiar to that shown in FIG. 1. To move the units to an operating position two 85 cylinders on each side move the units out through arc 79 to position 81. Here they are in their operating position. Penstock 6 now interfaces on reference line 82 and is locked into position at reference 83. The interface forms the seal with 7 race. The tail race now interfaces on reference line 82 and is locked into position at reference 83. The interface forms the seal with the turbine draught 8. The shutoff gates 65 are opened and the operation begins.

The installation is made on the SHIP at the surface levels in FIGS. 15 and 18. To maintain this level ballast tanks need to be added to the SHIP to compensate for plus or minus nominal loads. These are independent of the equalizing tanks of the penstock 6 and tail race 9.

The OCEAN WAVE HYDRO-ELECTRIC GENERATER SYSTEM need not affect the architecture of the SHIP. Lower and upper decks may still prevail.

Figure 3:
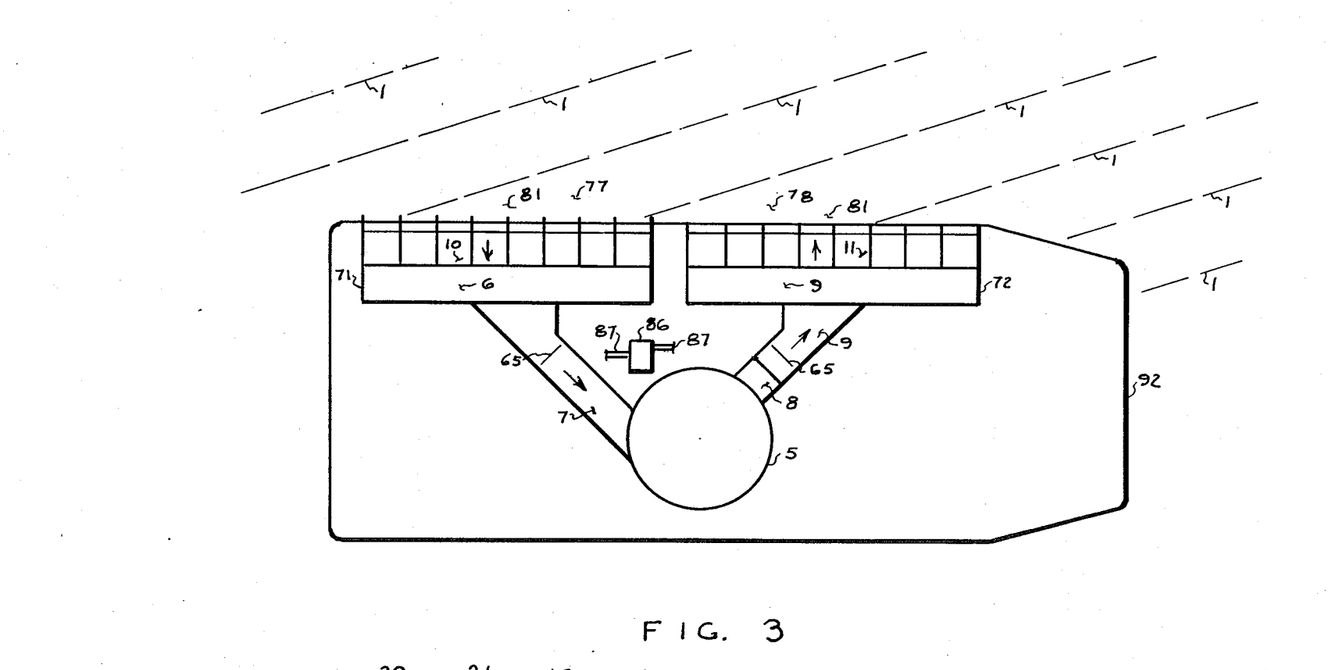
FIG. 3 shows a plan view arrangement of the OCEAN WAVE HYDRO-ELECTRIC GENERATOR FACILITY installed in a MULTIPURPOSE FLOATING PLATFORM.
Figure 4:
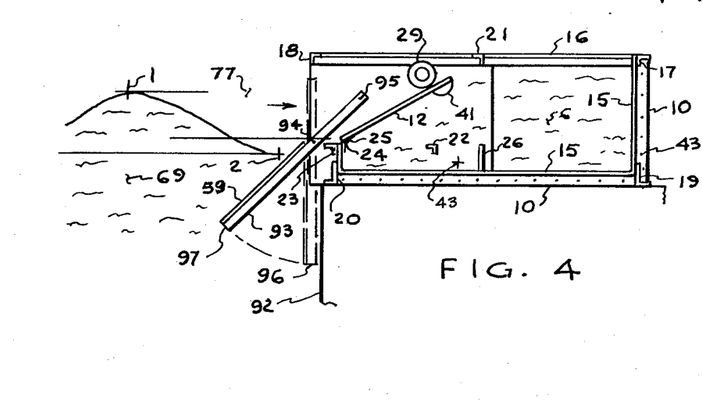
FIG. 4 shows the water input, wave capturing valve gate and penstock as used on a MULTIPURPOSE FLOATING PLATFORM.

FIG. 3 shows the installation of an OCEAN WAVE HYDRO-ELECTRIC GENERATER FACILITY installed on a FLOATING MULTIPURPOSE PLATFORM (Barge) 92 for use as a major power generating source for offshore drilling, exploration or mining operations.

92 is aligned and anchored with the waves as shown. The 10 and 11 units are similar to those used in FIG. 2 excepting that no equalizing tanks 88 are used. Eight units each are shown interconnected. The 5 turbine/generater is placed on the right side for a better load distribution. A 7 race runs from the penstock 6 to 5 turbine/generater as shown. The turbine draught 8 is connected to the tail race 9 as shown. The installation is permanently mounted and made an intregal part of 92 PLATFORM. 92 has several ballast tanks builtin, a transfer pump 86, plus connecting plumbing 87, and controls (not shown) to maintain the proper balance. Additional water ballast is used to maintain the proper elevation of the installation dependent on a plus or minus loading from the design norm.

Figure 5:
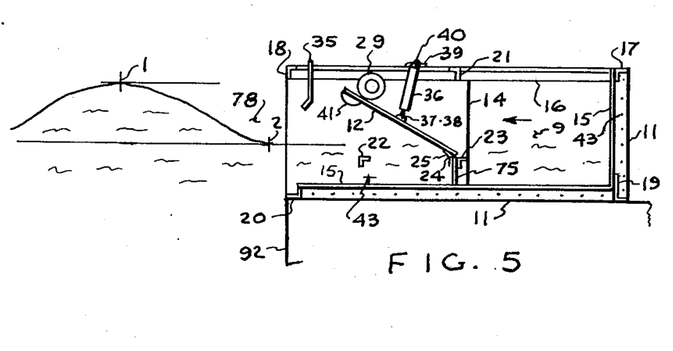
FIG. 5 shows the water discharge from the tail race and valve gate as used on a MULTIPURPOSE FLOATING PLATFORM.

FIGS. 4 and 5 show the installation level on 92. 19 and 20 structural members support the installation on the deck.

To begin operation shutoff gates 65 are removed in both 7 race and 9 tail race.

The number of 10 sectional units or 11 sectional units required are dependent on the size selection of the turbine/generator and the operating area conditions in which 92 is selected to be operating.

The turbine/generator technology is well established and documented and is not included herein.

This invention must not be considered restricted to that practiced otherwise than specifically described above or shown in the drawings but may be modified in various ways within the spirit, scope and operating requirement of the accompanying claims.

I claim:

1. A plurality of unidirectional valved intake gate units essentially relatively horizontally disposed, operating independently and located upstream of an input penstock, and adapted to intercept waves and convert their kinetic energy to drive a turbine, said gate units each comprising a moveable gate that is essentially horizontally hinged and adapted to permit the incoming waves and associated kinetic forces to slide over the upper surfaces of each of said gates and into said penstock, said gates being provided with gate stops limiting both the upward and downward movement of said gates, and wherein said unidirectional valved intake gates are adapted to operate at high and low tidal conditions, and constructed so that the back pressure of the penstock thrusts the independent valve gates upward directing the remaining forward moving wave energy and its associated kinetic forces to higher elevations increasing the water level height in the penstock.

2. A device according to claim 1, wherein said penstock is sufficient in length to accommodate a plurality of said moveable valve gate units which extend between two or more wave crests.

3. A device according to claim 2, wherein the structural arrangement of the valve and the penstock permit storm waves to pass over the entire structure and into the ocean behind.

4. A device according to claim 1, where said structure forming a penstock comprises a floor, landside vertical side wall, segmented by vertical intermediate members separating moveable oneway valve, seaside vertical structure from the floor for hinge mounting valve gate units, end panel to contain water therein, intermediate structural members to withstand force, and supporting structure.

5. A device according to claim 4, wherein the penstock is interfaced with turbine race to provide a continuous flow into the race and said turbine.

6. A device according to claim 4, wherein said penstock is equipped with vertical hinged check gates.

7. A device according to claim 1, wherein said moveable valve gate operates between two fixed vertical walls, a seal being formed between the valve gate panel surface edges and the fixed vertical walls.

8. A device according to claim 7, wherein said seal comprises a plurality of teflon bars, supported in guides and spring loaded to communicate with vertical section walls.

9. A device according to claim 1, wherein each valve gate comprises ridged floatable panels of hollow laminated honeycomb structure, floatable with or without float tanks.

10. A device according to claim 1, wherein the valve gates operate independently and from independently positioned and aligned pivot centerlines.

11. A device according to claim 13, wherein the moveable shuttle valve gates are sufficient in length to provide an inclined surface for the advancing wave segment in either a high or low ocean tidal condition.

12. A device according to claim 13, wherein the moveable shuttle valve gates are of sufficient length to permit the flexability of movement to function equally well independent of the variation in wave height.

13. A device wherein the shuttle valve gate movement accepting water into the penstock is regulated by stops acting as cams incorporating a pneumatic tired wheel.

14. A device according to claim 13, wherein the shuttle valve gate stops provide a bouncing pitch to the shuttle valve gate surface further elevating the height of the forward moving kinetic wave forces into the penstock.

15. A device according to claim 10, wherein the shuttle valve gate stops devised with their axis off-center adjust the shuttle valve gates to maintain uniform movement at any ocean tidal height condition by a one-half or less revolution of its axis.

16. A device according to claim 10, wherein the plurality of moveable shuttle valve gate stops are interconnected to one or more single axis control shafts controllable by a single or multiple servo unit.

17. A device according to claim 16, whereby movement of the stop's axis in a seaward or inland direction permit control of the moveable shuttle valve gates relative to tail race tail water level differential.

18. A device according to claim 1, comprising a structural flat panel, either fixed or adjustable beginning at the valve gate hinge extending seaward well below the level of the kinetic forces of the incoming waves at low tidal conditions forming an uninterrupted inclined sliding surface contiguous with the valve gate transporting these incoming kinetic forces on into the penstock.

19. An ocean wave energy device according to claim 1 incorporating inclined oneway moveable shuttle valve gates and penstock interfaced to turbine race fixed mounted on a pier near the peripheral edge of an ocean at an elevation to capture all incoming kinetic ocean wave forces and structure allowing for a "river flow" input affect feeding penstock, turbine race and submerged turbine.

20. A device of claim 1, comprising maintenance panel device to block water flow for service maintenance wherein a flat ridged panel surrounded on three sides of its periphery comprising a solid flexible or pneumatic boot in a manner forming an interface seal.

21. A device according to claim 20, wherein guide rails are installed on the structure ahead of the input side of the moveable valve gates and at frequent points along the penstock to accommodate maintenance panels.

22. A device according to claim 1, comprising a weir installed on the seaward or front side of the valve gate of the wave capturing unit to prevent damaging foreign material from entering the equipment.

23. A device according to claim 1, mounted on a ship and functional when anchored at sea.

24. A device according to claim 23, wherein said penstock is sufficient in length to accommodate a plurality of moveable shuttle valve gate units and extending between two or more wave crests.

25. A device according to claim 24, wherein the structural arrangement of the valve gates and the penstock permit storm waves to pass over the entire structure and on into the ocean behind while in operation.

26. A device according to claim 23, wherein a structure forming a penstock comprises a floor, rear vertical side wall, segmented by vertical intermediate members separating moveable oneway valve gates, front vertical structure from the floor for hinge mounting valve gates, end panel to contain water therein, intermediate structural members to withstand force, and supporting structure.

27. A device according to claim 26, wherein in operation the penstock is interfaced with turbine race to provide a continuous flow into the race and turbine.

28. A device according to claim 26, wherein said penstock is equipped with vertical hinged check gates.

29. A device according to claim 26, wherein the moveable valve gate operates between two fixed vertical walls, a seal being formed between the valve gate panel surface edges and the fixed vertical walls.

30. An ocean wave energy device according to claim 1, wherein inclined oneway moveable valve gates and penstock mount to a super structure mounted on a ship at an elevation to capture all incoming kinetic ocean wave forces allowing for a "river flow" input affect feeding penstock, turbine race and turbine.

31. A device according to claim 30, wherein the super structure incorporates float and ballast tanks to maintain ships stability in positioning and operation of the unit.

32. A device according to claim 30, wherein it is stowed within the hull of a ship and moveable outward around a common pivot and about an arc to position unit relative to ship's centerline.

33. A device according to claim 32, wherein it is moved from a stowed position to operating position by the use of hydraulic cylinders acting on the structure.

34. A device according to claim 30, wherein the penstock and turbine race both having oblique angle surfaces that when positioned for operation form an automatic interface seal between the penstock and turbine race.

35. A plurality of unidirectional valved outake gate units for water discharge into the sea located downstream of an output tail race, each gate unit comprising a moveable gate that is essentially horizontally hinged and with the outer extent of said gate extending between the water discharge outlet and said hinge, gate stops limiting both the upward and downward movement of said gate, and said gate units adapted to operate at high and low tide conditions and to discharge said water into the sea between wave crests, further comprising independent moveable valve gates moving about their hinge points balancing out automatically the incoming wave forces with the tail race flow and in plurality discharge on a continuous basis the tail race flow discharge requirement.

36. A device of claim 35, including means for receiving deenergized ocean wave water from a turbine draught in a "river flow" affect by a long tail race having a plurality of sections employing oneway moveable valve gates independently and continuously discharging it back into the ocean.

37. A device according to claim 36, wherein said tail race is sufficient in length to accommodate a plurality of moveable valve gate units extending between two or more wave crests.

38. A device according to claim 37, wherein the structural arrangement of the valve gates and the tail race permit storm waves to pass over the entire tail race structure and on into the ocean behind.

39. A device according to claim 36, wherein a structure forming a tail race and shuttle valve gate installation comprises a floor, landside vertical side wall, segmented by vertical intermediate members separating moveable oneway valve gates, intermediate structure from the floor for hinge mounting valve gates, end panel to withhold water, intermediate structural members to withstand force, and supporting structure.

40. A device according to claim 39, wherein said tail race is interfaced with turbine draught to provide a continuous exiting flow from the turbine draught to the tail race.

41. A device according to claim 39, wherein the tail race is equipped with vertical hinged check gates.

42. A device according to claim 39, wherein each moveable valve gate operates between two fixed vertical walls, a seal being formed between the valve gate panel surface edges and the fixed vertical walls.

43. A device of claim 36, wherein the valve gate movement discharging water from the tail race is regulated by stops acting as cams incorporating a pneumatic tired wheel.

44. A device according to claim 43, wherein the valve gate stops devised with their axis off-center adjust the valve gates to maintain uniform movement at any ocean tidal height condition by a one-half or less revolution of its axis.

45. A device according to claim 43, wherein the plurality of moveable valve gate stops are interconnected to one or more single axis control shafts controllable by a single or multiple servo unit.

46. A device according to claim 45, whereby movement of the axis stops in a seaward or inland direction permit control of the moveable valve gates relative to penstock head water level differential.

47. A device according to claim 30, wherein valve gates in the tail race have a portion of their opening movement shielded around their arc from the incoming wave water discharging from the tail race only at their lower limits of the shuttle valve gate movement.

48. A device of claim 36, wherein movement speed of the valve gate is controlled by shock absorbers mounted to the tail race structure an valve gate.

49. A device according to claim 36, wherein guide rails installed on the structure on the ocean wave side containing the moveable valve gates and at frequent points along the tail race to accommodate maintenance panels.

50. A device according to claim 36, mounted on a ship and functional when anchored at sea.

51. A device according to claim 50, wherein said tail race is sufficient in length to accommodate a plurality of moveable valve gate units extending between two or more wave crests.

52. A device according to claim 50, wherein the structural arrangement of the valve gates, shields and the tail race permit storm waves to pass over the entire tail race structure and on into the ocean behind.

53. A device according to claim 50, wherein a structure forming a tail race and valve gate installation comprises a floor, rear vertical side wall, segmented by vertical intermediate members separating moveable oneway valve gates, intermediate structure from the floor for hinge mounting valve gates, end panel to withhold water, intermediate structural members to withstand force, and supporting structure.

54. A device according to claim 53, wherein said tail race is interfaced with turbine draught to provide a continuous exiting flow from the turbine draught to the tail race.

55. A device according to claim 53, wherein the tail race is equipped with vertical hinged check gates.

56. A device according to claim 53, wherein a moveable valve gate operates between two fixed vertical walls, a seal being formed between the valve gate panel surface edges and the fixed vertical walls.

57. A device according to claim 35, wherein the shuttle valve gates are ridged floatable panels of hollow laminated honeycomb structure, floatable with or without float tanks.

58. A device according to claim 35, wherein said valve gates are horizontally hinged and elevated in a manner that as the wave trough moves back to sea the water in the tail race discharges moving over the valve gate upper surface as it lowers and out from the tail race to sea.

59. A device according to claim 35, wherein the valve gates operate independently and from independently positioned and aligned pivot centerlines.

60. A device according to claim 35, wherein the moving valve gates are sufficient in length to provide an inclined surface from the tail race discharge flow in either a high or low ocean tidal condition.

61. A device according to claim 35, wherein the tail race structure and segmented oneway valve gates incorporate the flexability of discharging at a multiple of wave trough lows seeking out the lowest continuous combinations.

62. An ocean wave energy device of claim 35, incorporating shields, inclined oneway moveable shuttle valve gates and tail race to interface with turbine draught all fixed mounted on a pier near the peripheral edge of an ocean at an elevation to discharge all deenergized ocean waves and structure allowing for a "river flow" output affect flowing from a turbine draught and tail race.

63. A wave motor apparatus comprising:
(a) at least one unidirectional valved intake gate intercepting waves and converting their kinetic energy to essentially horizontal flow;
(b) an intake penstock associated with said at least one gate and directing a constant flow of water;
(c) at least one fluid turbine;
(d) an output penstock; and
(e) a plurality of unidirectional valved output gates associated with said output penstock, adapted to constantly return water directly to the wave affected body of water with essentially no back pressure from said body of water.

64. A wave motor apparatus comprising:
(a) at least one unidirectional valved intake gate intercepting waves and converting their kinetic energy to essentially horizontal flow;
(b) an intake penstock associated with said at least one gate and directing a constant flow of water;
(c) at least one fluid turbine;
(d) an output penstock; and
(e) a plurality of unidirectional valved output gates associated with said output penstock, said unidirectional valved output gates adapted to constantly return water directly to the wave affected body of water between crests thereof.

65. The wave motor apparatus of claim 64, wherein said output gates are essentially horizontally hinged and with the outer extent of each of said gates extending between the respective water discharge outlets and hinges to restrict wave inflow, gate stops limiting both the upward and downward movements of said gates, and wherein said gates are adapted to operate at high and low tide conditions.

66. The wave motor apparatus of claim 65, wherein output valve gate movement is controlled by shock absorbers.

67. The wave motor apparatus of claim 65, wherein valve gate movement is regulated by stops acting as cams.

68. The wave motor apparatus of claim 67, wherein the valve gate stops are generally circular in cross-section with off-center axes.

* * * * *